April 18, 1950  S. C. CARTER  2,504,496
PACKING GLAND
Filed Aug. 20, 1945  2 Sheets-Sheet 1
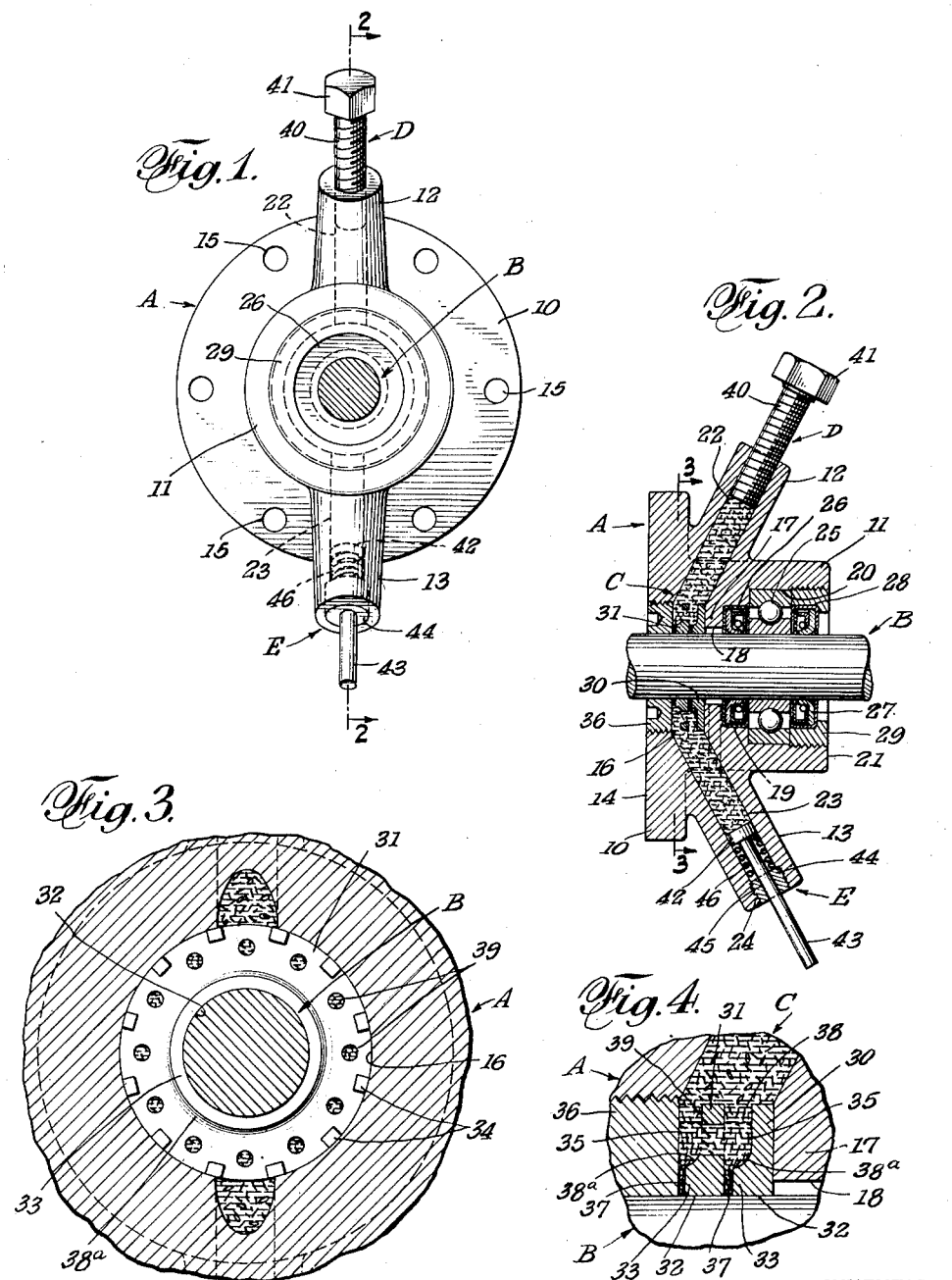
INVENTOR.
SAMUEL C. CARTER
BY
ATTORNEY

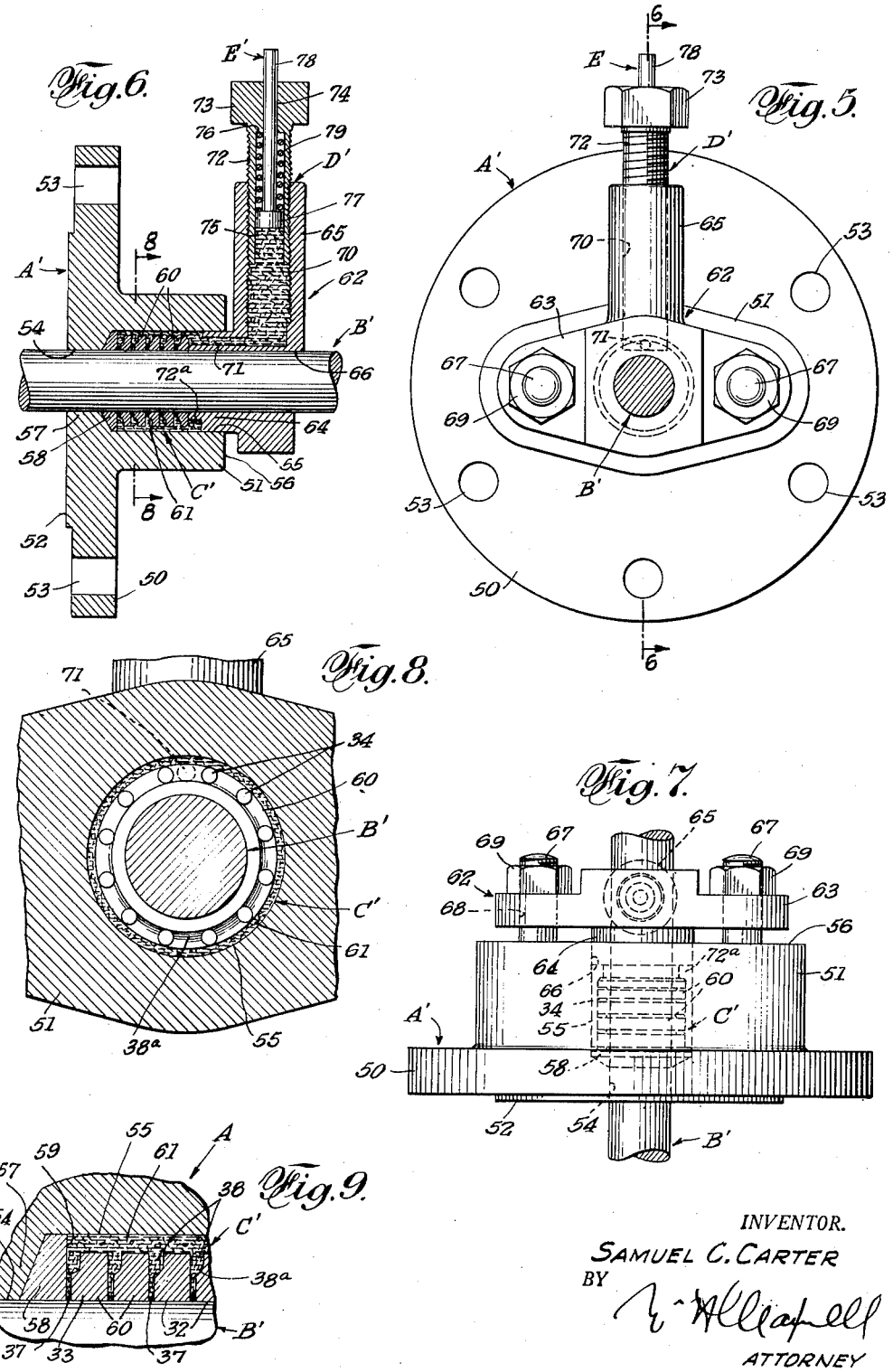

Patented Apr. 18, 1950

2,504,496

UNITED STATES PATENT OFFICE 2,504,496

PACKING GLAND

Samuel C. Carter, Glendale, Calif.

Application August 20, 1945, Serial No. 611,464

4 Claims. (Cl. 286—38)

This invention relates to packing glands and deals more particularly with a construction for sealing a shaft or rod operating in a gland whether for rotation or reciprocation. It is a general object of the invention to provide a simple practical improved and particularly efficient packing gland.

The conventional type of packing gland for a rotating or reciprocating member is designed on the stuffing box principle in which packing is placed around said member and is compressed to tightly hug it. Usual types of packing materials are natural or synthetic rubber, leather, asbestos, soft metal, fabric, etc. or combinations of these materials. When such materials are compressed around a rod, shaft or like member, said member becomes friction bound and it is necessary to carefully operate the mechanism of which the shaft is a part, to avoid deleterious results. If the packing is not made tight the structure is subject to leakage. Also, such packing materials may become "set" after a short period of time and even further compression frequently does not re-establish an effective packing seal. Further, the usual forms of packing function unevenly in that it is necessary, from time to time, to apply additional compression pressure to the packing to re-establish a reasonably effective seal.

Liquid seals have also been used to seal around a rotating or reciprocating member. Such seals, in addition to leaking or washing away, are particularly ineffective where high pressures and temperatures are involved.

Another object of my invention is to provide a packing gland for a rotating or reciprocating member embodying packing means for said member which is under continuous pressure to provide an effective seal at all times without interfering with the free operation of said member.

Another object of my invention is to provide a packing gland of the character indicated which is at all times fluid and pressure tight, highly resistant to corrosive fluids, and substantially unaffected by high temperatures.

Another object of my invention is to provide a packing gland of the character indicated employing plastic or semi-plastic packing material embodying novel means for directing and retaining said packing material in position to effectively seal a rotating or reciprocating member.

A further object of my invention is to provide a packing gland of the type referred to embodying novel means for distributing the packing material to desired sealing points of said gland.

A further object of my invention is to provide a packing gland of the nature referred to incorporating novel means for applying continuous pressure upon the packing material.

The various objects and features of my invention will be more fully understood from the following detailed description of typical, preferred forms and applications of the invention, throughout which description reference is made to the accompanying drawings, in which:

Fig. 1 is an end elevational view of a gland embodying the invention as applied to a rotating shaft;

Fig. 2 is a cross sectional view as taken on the line 2—2 of Fig. 1;

Fig. 3 is an enlarged fragmentary cross sectional view as taken on the line 3—3 of Fig. 2;

Fig. 4 is a further enlarged fragmentary detail view of the packing means employed in the invention;

Fig. 5 is a view similar to Fig. 1 of a modification of the invention as applied to a reciprocating shaft;

Fig. 6 is a cross sectional view as taken on the line 6—6 of Fig. 5;

Fig. 7 is a bottom plan view thereof;

Fig. 8 is an enlarged fragmentary sectional view as taken on the line 8—8 of Fig. 6; and Fig. 9 is a further enlarged fragmentary detail view of the packing means of the modification shown in Fig. 5.

A gland construction embodying my invention comprises, generally, a body or flange A passing an operating member B, packing means C carried by the flange A for sealing between said flange and the operating member B, means D whereby packing can be introduced into the gland, and means E for applying continuous pressure upon the packing.

The body or flange A is adapted to be mounted upon or formed as a part of a device, machine or mechanism of which the member B may be an operating part and said body can, therefore, be designed in various ways in accordance with specific requirements. One general type of mechanism which is particularly adapted for the application of my gland includes pumps, engines, motors, valves, etc., wherein it is desired to efficiently seal said mechanisms against fluid leakage under various conditions of pressure and temperature.

In the embodiment of my invention which is shown in Figs. 1 to 4, inclusive, I have provided a packing gland particularly adapted to be applied to and to form part of a pump, or the like, having a rotating member B. The modification I have shown in Figs. 5 to 9, inclusive, comprises a gland suitable to be mounted on and form part of a pump, engine, or valve having a reciprocating or longitudinally movable piston B', or the like. The said two embodiments of the invention serve only to illustrate examples of practical forms of my invention.

In Figs. 1 to 4, inclusive, I have shown the body A as comprising a metal casting formed with a generally circular flange or plate 10, a circular concentric hub 11 on one side of said plate, and opposed outwardly and angularly directed bosses 12 and 13 extending from the line of jointure between the plate 10 and the hub 11. I provide the plate 10 with an outer machined face 14 and with a plurality of transverse mounting holes 15 whereby the gland can be applied to a mechanism as before indicated and fixedly mounted thereon as by screws or bolts.

The body casting A has a through axial opening which I have shown as comprising a bore 16 extending from the face 14 inwardly to one side of an internal shoulder flange 17 provided with a smaller or reduced bore 18, a bore 19 extending from the other side of the flange 17, and a counterbore 20 extending from the bore 19 to the outer face 21 of the hub 11. I show the bores 16 and 20 as internally threaded for part of their depth inwardly from the respective faces 14 and 21.

I provide the boss 12 with an axial threaded passage 22 and the boss 13 with a similar passage 23 which is threaded at its outer end at 24. The passages 22 and 23 are arranged and directed to communicate with the bore 16 and comprise passages for introducing the packing material to the bore 16.

The member B, which I have shown as a rotating shaft, extends through the axial opening in body A and, in practice, I mount said shaft in an anti-friction radial bearing 25 located in the counter-bore 20. In practice I provide flanking lubricating retaining seals 26 and 27 at either side of the bearing to hold lubricant in said bearing. I show the seal 26 in the bore 19 and the seal 27 in a concentric bore 28 formed in a retaining nut 29 which is threaded into the counterbore 20 to hold the bearing 25 in place.

An important feature of my invention is the structure that I provide in the body A and around member B to carry and direct the plastic packing that I employ. In the arrangement being described this structure is located in the bore 16 and between shoulder flange 17 and a retaining or closure ring 36 threaded in the outer end portion of the bore 16. The structure may involve a single inserted member or it may involve a plurality of members as I have shown in the drawings. In the structure shown I provide a metallic ring disc 30 in the bore 16 bearing against the shoulder flange 17. I provide one or more similar discs 31 in the bore 16 positioned to bear against said disc 30. In the drawing I have shown but one disc 31. These discs 30 and 31 comprise part of the packing means C.

The discs 30 and 31 are circular or ring-like elements and the outside diameter of the discs 30 and 31 is such as to allow the discs to freely fit the bore 16. The central axial hole or bore 32 of each disc slidably receives or passes the shaft B. I show each disc as somewhat thickened around or adjacent the hole 32 as at 33 and I provide each disc at or near its periphery with a plurality of laterally projecting circumferentially spaced lugs 34 which are of greater extent laterally than the thickened portion of the disc. The lugs 34 form spacers for the discs 30 and 31 whereby unobstructed annular spaces 35 occur between the discs and between the outermost disc 31 and the closure nut 36 engaged in the threads of the bore 16. It will be seen that the spaces 35 are in full communication with the holes 22 and 23. Because of the thickened portions 33 of the discs each space 35 has a relatively thin and narrow restricted part or throat 37 immediately around the shaft B. In practice, under ordinary working conditions I make the throat openings so they are about $\frac{1}{16}$ of an inch in width at the shaft. The outer portion 38 of each space 35 is very much wider than the throat portion thereof. I provide the members 30 and 31 with curved walls 38$^a$ joining the throat and outer portions of the spaces to eliminate any sharp or abrupt change in capacity from the large spaces 38 to the throats 37. The walls 38$^a$ serve to direct packing gradually from the outer portions 38 into the throats 37.

Free axial communication is provided between the wider or outer portions 38 of the annular spaces 35 by providing the discs 31 with a suitable number of transverse or axial holes or openings 39.

From the foregoing it will be apparent that I have provided packing material receiving, directing and retaining spaces which serve to gradually constrict packing material as it passes from the wider or larger outer portions 38 to the narrower or restricted throats 37 at the shaft.

The packing material is introduced into the annular spaces 35 through the mentioned passage 22, said passage comprising part of the means D which further comprises an elongated feed screw 40 which operates in the passage. I provide the screw 40 with means such as the head 41 whereby it can be operated to move axially in said passage.

The means E, which includes the passage 23, comprises a plunger 42 disposed in the passage 23, an outwardly directed stem 43 on said plunger, a retaining nut 44 engaged in the threaded portion 24 of the passage and having a central hole 45 through which the stem 43 passes, and a helical spring 46 around the stem and in end abutment with the nut 44 and the plunger 42. The plunger 42 is movable longitudinally in the passage 23 and is normally urged against the packing by the spring 46.

The packing material which I employ may vary greatly in its composition. Generally, it may comprise a metallic or partially metallic material which is solid at normal temperatures and pressures and which is capable of limited distortion and flow when subjected to high pressures. Small flattened particles or flakes of metal, or the equivalent, may form an essential ingredient of the material I contemplate using and the material may generally comprise such ingredients as polymerized chloroprene flour, castor oil, or a like material, and a neoprene cement binder. One form of such packing material is disclosed in my patent entitled "Packing material," No. 2,286,260 dated June 16, 1942.

By means of the gland which I have provided, the packing material is introduced into the passage 22 and the feed screw 40 is turned to force the material first into the outer wider portions 38, and then into the throats 37 of spaces 37 under guidance of the curved walls 38$^a$. As the material is thus confined or restricted, the flattened flakes seek a more orderly or regimented arrangement in the mass with their flat sides parallel or substantially so.

When, by continued pressure of the screw, the material is forced through the inner narrower throats 37, said flakes are compressed into closer contiguity by forcing out most, if not all, of the other ingredients from among them and finally, when the material encounters the shaft B, for practical purposes, there is presented a substantially wholly metallic packing around the shaft which comprises the edges of a large number of substantially parallel metallic flakes. Since the material will pass through the holes 39 provided in the discs 31, the material residing in said holes serve to connect and unify the packing rings thus provided in the spaces 35.

Pressure of the feed screw 40 will force material into the passage 23 and continued pressure will cause the material to project the plunger 42 outwardly against the pressure of the spring 46. When said plunger has reached its limit of outward movement the feed of the screw 40 may be stopped. During continued rotation of the shaft B, any wear on the metallic packing around the shaft which may result in reduced efficiency of the packing is immediately and continuously taken up by the continuous pressure of the plunger 42 on the packing material in the gland. Over a long period of time, a sufficient amount of the material may be used up to bring the plunger 42 into close proximity with the rings 30 and 31. At this time the plunger stem 43 will have little or no projection beyond the nut 45. The amount of said stem projecting from the boss 13, therefore, indicates whether additional packing material is needed in the gland. An additional supply of material can be readily introduced into the passage 22 without the need for stopping the operation of the mechanism to which the gland is applied.

In the embodiment of the invention illustrated in Figs. 5 to 9, inclusive, I have shown the body A' as comprising a metal casting formed with a circular plate 50 and a central lateral hub 51. I provide the plate 50 with an outer machined face 52 and with a plurality of transverse mounting holes 53 whereby the gland can be applied to a mechanism before indicated and fixedly mounted thereon. I provide the body casting A' with a through axial opening which I have shown as comprising a small bore 54 extending inwardly from the face 52, and a counter-bore 55 extending from the bore 54 to the outer face 56 of the hub 51.

The member B', which I have shown as a reciprocating or axially movable shaft, extends through the axial opening and freely or slidably fits the bore 54. I provide a metal seat disc 58 in the bottom of the counter-bore 54 to bear against the shoulder flange 57. The disc 58 has a flat transverse face 59 directed toward the open end of the bore 54. Laterally positioned against this disc face 59 I provide one or more metallic ring-shaped discs 60 arranged in side to side or face to face relation. These discs are substantially similar to the disc 30 hereinbefore described, each having a central opening 32, a thickened portion 33, a curved wall 38ª, and spacing lugs 34. The only material difference between the discs 60 and the disc 30 is that they are smaller in diameter than the counter-bore 55 to provide a continuous uninterrupted annular connecting passage 61 which interconnects the packing material receiving spaces 35 between said discs. Therefore, the construction just described provides a plurality of longitudinally arranged wider and narrower annular space portions 38 and 37, respectively, substantially as before described.

In the form of the invention now being described, I combine the means D' and E' and incorporate the same in a single separate carrier 62 which may be a casting and which comprises a plate 63, a lateral boss 64 thereon, and a radially directed tubular extension 65. I show the plate 63 and boss 64 as having an axial bore 66 whereby said casting can be mounted on the shaft B' with the boss 64 fitting into the open end of the counter-bore 55. I may fasten the two castings together by means of studs 67 carried by the hub 51 on either side of the shaft and which project through aligned holes 68 in the plate 63, and nuts 69 on the studs arranged to draw the two castings together axially. In this manner, the end of the boss 64 engages against the outermost disc 60 to hold the discs 60 in contiguous position.

I show the tubular extension 65 with an open-ended threaded axial passage 70 and a connecting longitudinal passage 71 in the boss 64 which opens at the end of the boss which bears against the discs 60. I preferably reduce the diameter of the end of said boss 64 at 72ª so that the passage 71 has free communication with the mentioned annular passage 61. In the above manner I provide interconnected passage and spaces comprising the passages 70 and 71, the annular passage 61, and the spaces 35 between the discs 60.

The feed screw 72 of the means E' has a polygonal head 73 and differs from the screw 40 in that I provide it with a through axial opening comprising an outer smaller hole 74 and an inner larger bore 75 which connects with the passage 70. The bore 75 terminates at a shoulder 76 in the feed screw, and I provide a plunger 77 having a stem 78 positioned for longitudinal movement in said bore 75 and hole 74, respectively. A spring 79 is provided around the stem and between the shoulder 76 and plunger 77.

It will be obvious from the above that the screw 72 and the plunger 77 will function in the same general manner as described for the screw 40 and plunger 42. It will be further evident that packing material can be introduced into the passage 70 to be forced, as before set forth, into the spaces 35 between the discs 60 to provide an effective seal for the shaft B'.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A packing gland of the character described including a gland body having an axial bore, a movable member in said bore, and means for sealing between said body and said member including, a plurality of like discs around said member and in said bore cooperating to form annular inwardly convergent openings extending radially inward to said member and surrounding said member, and flowable packing material fitting said openings and in sealing contact with said movable member.

2. A packing gland of the character described including a gland body having an axial bore, a movable member in said bore, and means for sealing between said body and said member including, a plurality of metal discs around said member and in said bore, and flowable packing material between said discs and in sealing contact with said bore and said movable member, each of said discs including a ring-shaped element having a thickened central portion with a central hole passing said member, and a plurality of laterally projecting spacer lugs remote from said portion.

3. A shaft packing including a housing body for the shaft, an enlarged annular chamber in the body around the shaft, a plurality of like discs mounted on the shaft and within the chamber, each disc having a thickened annular central portion around and adjacent the shaft, a plurality of circumferentially spaced integral axially projected spacer lugs on each disc remote from the thickened portion, and flowable packing material between said portions of the discs and in sealing contact with the shaft.

4. A packing gland of the character described including, a gland body having an axial bore, a movable member in said bore, and means sealing between said body and said member including, a plurality of discs around said member and within said bore, the discs being of smaller diameter than the bore and providing an annular packing carrying passage between the wall of the bore and the peripheries of the discs, means spacing said discs apart longitudinally of said bore, and flowable packing material between and around said discs and in sealing contact with said bore and said movable member.

SAMUEL C. CARTER.

REFERENCES CITED

The following references are of record in the file of this patent:

UNITED STATES PATENTS

| Number | Name | Date |
| --- | --- | --- |
| 779,785 | Junggren | Jan. 10, 1905 |
| 1,828,178 | Fox | Oct. 20, 1931 |
| 1,837,115 | Cook | Dec. 15, 1931 |
| 1,844,903 | Queen | Feb. 9, 1932 |
| 2,032,817 | Svenson | Mar. 3, 1936 |

FOREIGN PATENTS

| Number | Country | Date |
| --- | --- | --- |
| 37,194 | Norway | of 1923 |
| 528,416 | Germany | of 1931 |
| 806,024 | France | of 1936 |